(12) United States Patent
Higashihara

(10) Patent No.: US 7,249,511 B2
(45) Date of Patent: Jul. 31, 2007

(54) METHOD OF DETECTING RESONANT FREQUENCY, METHOD OF SELECTING RESONANCE FREQUENCY, AND DEVICE FOR DETECTING RESONANT FREQUENCY SENSOR

(75) Inventor: Daisuke Higashihara, Hyogo (JP)

(73) Assignee: TOA Corporation, Hyogo (JP)

( * ) Notice: Subject to any disclaimer, the term of this patent is extended or adjusted under 35 U.S.C. 154(b) by 0 days.

(21) Appl. No.: 10/537,984

(22) PCT Filed: Dec. 9, 2003

(86) PCT No.: PCT/JP03/15703

§ 371 (c)(1),
(2), (4) Date: Dec. 19, 2005

(87) PCT Pub. No.: WO2004/054316

PCT Pub. Date: Jun. 24, 2004

(65) Prior Publication Data

US 2006/0137454 A1    Jun. 29, 2006

(30) Foreign Application Priority Data

Dec. 9, 2002  (JP) .............................. 2002-357124
Jan. 30, 2003  (JP) .............................. 2003-021558

(51) Int. Cl.
*G01H 7/00* (2006.01)
*H04R 29/00* (2006.01)
(52) U.S. Cl. .............................. 73/579; 73/586; 381/58
(58) Field of Classification Search ............... 73/579, 73/586, 596–600, 602, 645, 646; 381/83, 381/95–98, 58–60, 63–64
See application file for complete search history.

(56) References Cited

U.S. PATENT DOCUMENTS

| 4,389,892 | A | * | 6/1983 | Niimi et al. | 73/586 |
| 4,905,290 | A | * | 2/1990 | Yaoita | 381/83 |
| 5,559,851 | A | | 9/1996 | Schmitt | |
| 5,572,443 | A | * | 11/1996 | Emoto et al. | 702/103 |
| 6,155,116 | A | * | 12/2000 | Muench et al. | 73/599 |
| 6,655,212 | B2 | * | 12/2003 | Ohta | 73/586 |
| 7,058,182 | B2 | * | 6/2006 | Kates | 381/60 |
| 7,065,221 | B1 | * | 6/2006 | Tanaka | 381/96 |

FOREIGN PATENT DOCUMENTS

| JP | 04-115127 | 4/1992 |
| JP | 04-295728 | 10/1992 |
| JP | 05-072024 | 3/1993 |
| JP | 5-346792 | 12/1993 |
| JP | 06-202671 | 7/1994 |

OTHER PUBLICATIONS

International Application No. PCT/JP03/15703 *International Search Report* by the Japanese Patent Office dated Mar. 9, 2004.

* cited by examiner

*Primary Examiner*—Helen Kwok
(74) *Attorney, Agent, or Firm*—Marshall, Gerstein & Borun LLP

(57) ABSTRACT

A device for detecting a resonant frequency comprises a sound source, a switch, a mixer, and a sound meter. The switch and mixer are capable of switching between a first state in which the switch and mixer output a measurement signal and a second state in which the switch and mixer output a synthesized signal containing the measurement signal and the signal output from a microphone. The device detects the resonant frequency based on comparison between the first amplitude frequency characteristic measured in the first state and the second amplitude frequency characteristic measured in the second state.

10 Claims, 5 Drawing Sheets

METHOD OF DETECTING RESONANT FREQUENCY, METHOD OF SELECTING RESONANCE FREQUENCY, AND DEVICE FOR DETECTING RESONANT FREQUENCY SENSOR

The present application claims the benefit of priority of International Patent Application No. PCT/JP2003/015703 filed on Dec. 9, 2003, which application claims priority of Japanese Patent Application No. 2003-021558 filed Jan. 30, 2003 and Japanese Patent Application No. 2002-357124 filed Dec. 9, 2002. The entire text of the priority application is incorporated herein by reference in its entirety.

TECHNICAL FIELD

The present invention relates to a method and device for detecting a resonant frequency in a resonant space, and a method of selecting a resonant frequency to be set as a dip center frequency in a dip filter from detected resonant frequencies.

BACKGROUND ART

In some cases, it is necessary to detect a resonant frequency in a resonant space. For example, when acoustic equipment such as a speaker is installed in a hall or a gymnasium to radiate a loud sound wave from a speaker, music or voice from the speaker is sometimes difficult to listen to because of the presence of a resonant frequency in this space (loud sound space in which the acoustic equipment is installed). To be specific, if the loud sound wave from the speaker contains a component of the resonant frequency in large amount, resonance occurs in a frequency of this component in the loud sound space. A resonant sound is like "won . . . " or "fan . . . ." The resonant sound is not a sound wave to be radiated from the speaker and makes it difficult to listen to the music or the voice from the speaker.

To avoid this, the resonant frequency in the loud sound space is detected, and a dip filter or the like is provided at a forward stage of the speaker in the acoustic equipment to attenuate the component of the resonant frequency. Thereby, resonance is unlikely to occur in this loud sound space, making it easy to listen to the music or the voice from the speaker. In order to determine a frequency characteristic of the dip filter, it is necessary to first detect the resonant frequency in the loud sound space.

Traditionally, an operator or a measuring person for the acoustic equipment has distinguished the loud sound from the speaker or the resonant sound depending on their senses of hearing to make judgment of the resonant frequency.

However, some skill or experience is required to distinguish the sound for judgment of the resonant frequency depending on the senses of hearing. Such detection of the resonant frequency depending on the skill or experience is not always accurate. Further, this has impeded automatic measurement and automatic adjustment of the acoustic equipment installed in the loud sound space or the like.

DISCLOSURE OF THE INVENTION

An object of the present invention is to provide a method and device for detecting a resonant frequency, which are capable of accurately detecting the resonant frequency without a need for any experience or skill. Another object of the present invention is to provide a method of selecting a resonant frequency, which is capable of objectively selecting a frequency to be set as a dip center frequency in a dip filter from a plurality of detected resonant frequencies.

In order to achieve the above mentioned object, a method of detecting a resonant frequency of the present invention, comprises a first step of measuring a first amplitude frequency characteristic; and a second step of measuring a second amplitude frequency characteristic, wherein the first amplitude frequency characteristic is an amplitude frequency characteristic obtained by outputting a loud sound wave of a predetermined measurement signal from a speaker placed in a resonant space and by receiving the loud sound wave in a microphone placed in the resonant space, wherein the second amplitude frequency characteristic is an amplitude frequency characteristic obtained by outputting, from the speaker, a loud sound wave of a synthesized signal containing the measurement signal and a signal output from the microphone and by receiving the loud sound wave of the synthesized signal in the microphone, and wherein the resonant frequency in the resonant space is detected based on comparison between the first amplitude frequency characteristic measured in the first step and the second amplitude frequency characteristic measured in the second step.

In order to achieve the above mentioned object, a device for detecting a resonant frequency of the present invention, comprises a sound source means; a signal synthesization switching means; and a measuring means, wherein the sound source means is configured to generate a measurement signal output from a speaker, the signal synthesization switching means is capable of receiving, as inputs, the measurement signal from the sound source means and a signal output from the microphone, the signal synthesization switching means is capable of switching between a first state in which the signal synthesization switching means outputs the measurement signal and a second state in which the signal synthesization switching means outputs a synthesized signal containing the measurement signal and the signal output from the microphone, the measuring means is capable of measuring an amplitude frequency characteristic from the signal output from the microphone, and the measuring means is configured to detect the resonant frequency based on comparison between a first amplitude frequency characteristic measured in the first state of the signal synthesization switching means and a second amplitude frequency characteristic measured in the second state of the signal synthesization switching means.

The second amplitude frequency characteristic measured in the above method and device is an amplitude frequency characteristic of a system, including a feedback loop in which the signal output from the microphone is input to the speaker. Because of the feedback loop, the second amplitude frequency characteristic shows a noticeable effect of the resonant characteristic of the resonant space in contrast to the first amplitude frequency characteristic. Therefore, by comparing the first amplitude frequency characteristic to the second amplitude frequency characteristic, the resonant frequency in the resonant space can be accurately detected.

In the method of detecting a resonant frequency, a peak frequency at which an amplitude of the second amplitude frequency characteristic is larger than an amplitude of the first amplitude frequency characteristic may be detected as the resonant frequency, from a difference between the first amplitude frequency characteristic and the second amplitude frequency characteristic.

In the device for detecting a resonant frequency, a peak frequency at which an amplitude of the second amplitude frequency characteristic is larger than an amplitude of the first amplitude frequency characteristic may be detected as the resonant frequency from a difference between the first amplitude frequency characteristic and the second amplitude frequency characteristic.

In the above described method and device for detecting a resonant frequency, a sine wave sweep signal is effective as the measurement signal.

In order to achieve the above mentioned object, a method of selecting a resonant frequency of the present invention, comprises detecting a plurality of resonant frequencies by the above mentioned method of detecting a resonant frequency; and selecting dip center frequencies to be set in a dip filter in decreasing order of amplitude levels in the second amplitude frequency characteristic, from the plurality of detected resonant frequencies. In accordance with this method, the dip center frequencies to be set in the dip filter can be objectively selected from the plurality of detected resonant frequencies without depending on any experience or skill.

In order to achieve the above mentioned object, a method of selecting a resonant frequency of the present invention, comprises selecting a plurality of resonant frequencies by the above mentioned method of selecting a resonant frequency; and preferentially selecting, from the plurality of selected resonant frequencies, dip center frequencies to be set in a dip filter in decreasing order of amplitude levels in an amplitude frequency characteristic obtained by subtracting the first amplitude frequency characteristic from the second amplitude frequency characteristic. The second amplitude frequency characteristic shows a noticeable effect of the resonant characteristic of the resonant space in contrast to the first amplitude frequency characteristic. By selecting the dip center frequencies to be set in the dip filter based on the magnitude of the amplitude level of the amplitude frequency characteristic obtained by subtracting the first amplitude frequency characteristic from the second amplitude frequency characteristic, resonance in the loud sound space is effectively prevented.

The above and further objects and features of the invention will be more fully be apparent from the following detailed description with the accompanying drawings.

BEST MODE FOR CARRYING OUT THE INVENTION

Embodiments of the present invention will be described with reference to the drawings.

Figure 1:
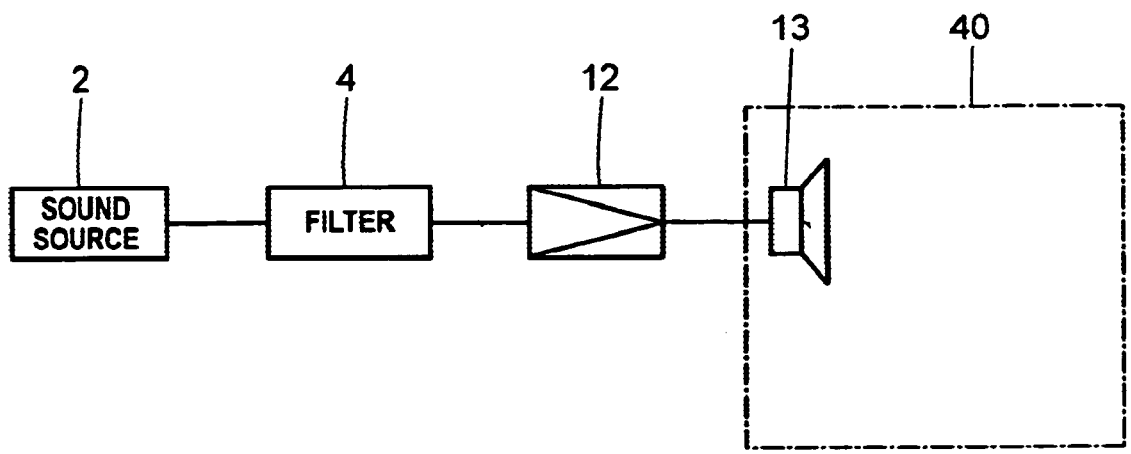
FIG. 1 is a schematic view of a construction of an acoustic system installed in a loud sound space.

FIG. 1 is a schematic view of a construction of an acoustic system installed in a loud sound space (e.g., concert hall or gymnasium) 40. The acoustic system comprises a sound source device 2, a dip filter 4, an amplifier 12, and a speaker 13. The sound source device 2 may be a music instrument such as a CD player for playback of, for example, music CD, or a microphone. While the sound source device 2 is illustrated as being located outside the loud sound space 40 in FIG. 1, it may alternatively be located within the loud sound space 40. The sound source device 2 may be, for example, a microphone installed within the loud sound space 40. The dip filter 4 serves to remove a signal component in a specified frequency from a signal output from the sound source device 2 and to output the resulting signal to the amplifier 12. The amplifier 12 amplifies the signal output from the dip filter 4 and outputs the amplified signal to the speaker 13, which outputs a loud sound wave in the loud sound space 40.

When the loud sound space 40 has a resonant frequency and the loud sound wave output from the speaker 13 contains a component of the resonant frequency in large amount, resonance occurs in the loud sound space 40 and thereby music or voice output from the speaker 13 is difficult to listen to. If an appropriate frequency characteristic is set in the dip filter 4 in this acoustic system, then the resonance in the loud sound space 40 is prevented without degrading a sound quality of the loud sound wave from the speaker 13.

In this embodiment, resonant frequencies in the resonant space 40 are detected, and a frequency to be set as a dip center frequency in the dip filter 4 is selected from the detected resonant frequencies. First of all, a method and device for detecting the resonant frequency in the resonant space 40 will be described with reference to FIGS. 2 to 6.

Figure 2:
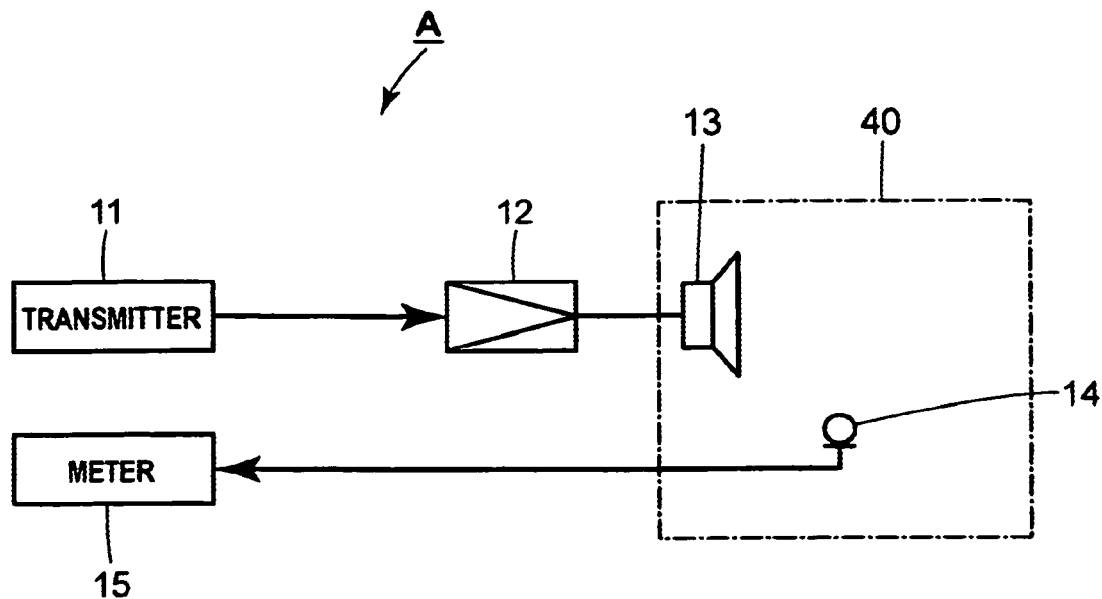
FIG. 2 is a schematic block diagram of a system for measuring an amplitude frequency characteristic of the loud sound space.

FIG. 2 is a schematic block diagram of a system A for measuring an amplitude frequency characteristic of the loud sound space (e.g., concert hall or gymnasium) 40. The system A comprises a transmitter 11 which is a sound source means configured to output a measurement signal, an amplifier 12 configured to receive, as an input, the signal output from the transmitter 11 and to power-amplifies the signal, a speaker 13 configured to receive, as an input, the signal output from the amplifier 12 and to output a loud sound wave, a microphone 14 configured to receive the loud sound wave radiated from the speaker 13, and a meter 15 configured to receive, as an input, the sound wave from the microphone 14. The microphone 14 may be a noise meter.

The speaker 13 and the microphone 14 are placed within the loud sound space 40. The microphone 14 is positioned to be sufficiently distant from the speaker 13 within the loud sound space 40. The microphone 14 is positioned so as to receive a reflected sound of the sound wave directly output from the speaker 13 at a sufficiently high level within the loud sound space 40.

The transmitter 11 outputs, as the measurement signal, a sine wave signal whose frequency varies with time, i.e., a sine wave sweep signal. The sine wave sweep signal has a constant sine wave level at respective time points during frequency sweep.

The meter 15 has a band pass filter whose center frequency varies with time. The band pass filter varies the center frequency with time according to time variation of the frequency of the sine wave sweep signal output from the transmitter 11. Therefore, the meter 15 detects the level of the signal which has been received as an input from the microphone 14 and has passed through the band pass filter, thus measuring an amplitude characteristic of the frequency at that point of time.

Figure 3:
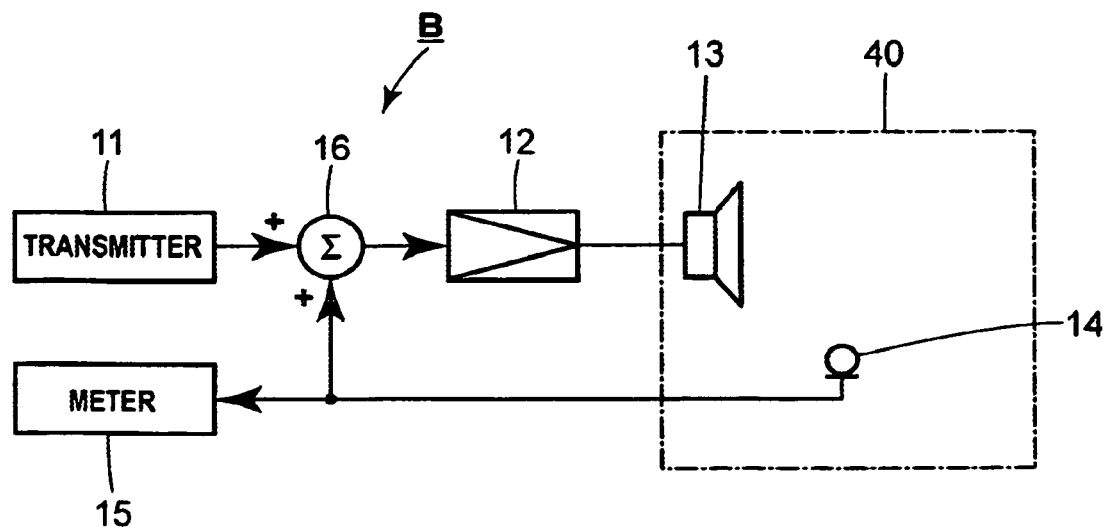
FIG. 3 is a schematic block diagram of a system for measuring an amplitude frequency characteristic of the loud sound space.

FIG. 3 is a schematic block diagram of a system B for measuring an amplitude frequency characteristic of the loud sound space 40. The system B is constructed such that a signal synthesization path is added to the system A of FIG. 2. To be specific, the system B of FIG. 3 comprises the transmitter 11 which is the sound source means configured to output the measurement signal, a mixer 16, the amplifier 12 configured to receive, as an input, a signal output from the mixer 16 and to power-amplify the signal, the speaker 13 configured to receive, as an input, the signal output from the amplifier 12 and to output a loud sound wave, the microphone 14 configured to receive the loud sound wave radiated from the speaker 13, and the meter 15 configured to receive, as an input, the sound wave output from the microphone 14.

The speaker 13 and the microphone 14 are placed at the same positions within the loud sound space 40 as those in the system A of FIG. 2. The transmitter 11, the amplifier 12, the speaker 13, the microphone 14, and the meter 15 in the system B of FIG. 3 are identical to those in the system A of FIG. 2.

The difference between the system B of FIG. 3 and the system A of FIG. 2 is that the amplifier 12 receives, as the input, the signal output from the transmitter 11 in the system A of FIG. 2, while the amplifier 12 receives, as the input, the signal output from the mixer 16 in the system B of FIG. 3. The mixer 16 of FIG. 3 receives, as inputs, the measurement signal (sine wave sweep signal) output from the transmitter 11 and the sound wave from the microphone 14, synthesizes (mix) these signals, and outputs a synthesized signal (mixed signal).

Figure 4:
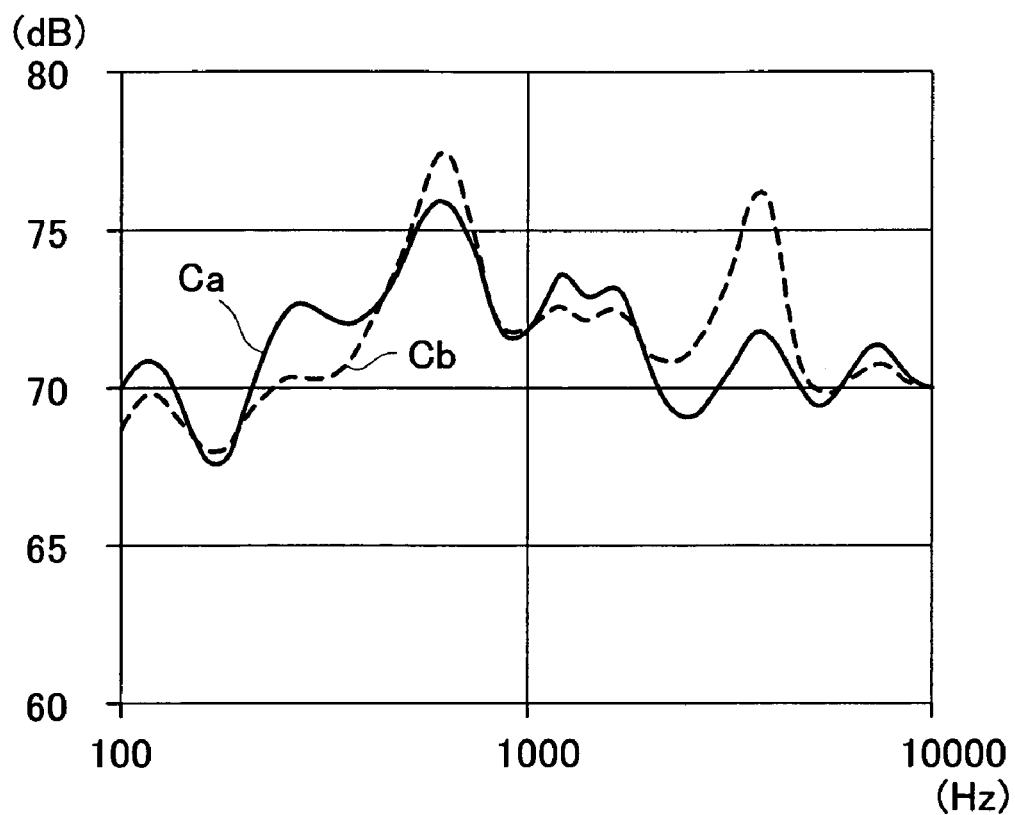
FIG. 4 is a view schematically showing an amplitude frequency characteristic of the loud sound space which is measured by the system of FIG. 1 and an amplitude frequency characteristic of the loud sound space which is measured by the system of FIG. 2.

FIG. 4 is a view schematically showing an amplitude frequency characteristic of the loud sound space 40 which is measured by the system A of FIG. 2 and an amplitude frequency characteristic of the loud sound space 40 which is measured by the system B of FIG. 3. In FIG. 4, a curve Ca indicated by a solid line is the amplitude frequency characteristic measured by the system A of FIG. 2 and a curve Cb indicated by a broken line is the amplitude frequency characteristic measured by the system B of FIG. 3.

Both the system A of FIG. 2 and the system B of FIG. 3 measure amplitude values at a number of frequency points. For example, in a range of frequencies to be measured, the systems A and B measure the amplitude values at intervals of 1/192 octave. The measurement values at a number of points (a number of frequency points) may be indicated by the curves Ca and Cb as the amplitude frequency characteristics of the loud sound space 40 without being smoothed on a frequency axis, or otherwise may be indicated by the curves Ca and Cb after they are smoothed on the frequency axis in some method or another. The measurement values may be smoothed in various methods, including moving average, for example. For example, moving average of 9 points may be performed for the measurement values at a number of frequency points on the frequency axis. When the smoothed measurement values are used as the curve Ca, the smoothed measurement values are desirably used as the curve Cb. In this case, the curve Cb is desirably obtained by the same smoothing method as the curve Ca. If the curve Ca is obtained by performing moving average of 9 points on the frequency axis, then the curve Cb is desirably obtained by performing moving average of 9 points on the frequency axis.

The amplitude frequency characteristic indicated by the solid line curve Ca of FIG. 4 contains the resonant characteristic of the loud sound space 40 as well as the characteristic of the acoustic system including the amplifier 12, the speaker 13, and the microphone 14. The amplitude frequency characteristic indicated by the broken line curve Cb of FIG. 4 also includes the resonant characteristic of the loud sound space 40 as well as the characteristic of the acoustic system including the amplifier 12, the speaker 13, and the microphone 14. The amplitude frequency characteristic indicated by the broken line curve Cb shows a noticeable effect of the resonant characteristic of the loud sound space 40 by a feedback loop in which the signal output from the microphone 14 is input to the amplifier 12 and is output from the speaker 13, in contrast to the amplitude frequency characteristic of the solid line curve Ca. Therefore, based on the difference between the curves (solid line curve Ca and broken line curve Cb), the resonant characteristic of the loud space 40 is known.

Figure 5:
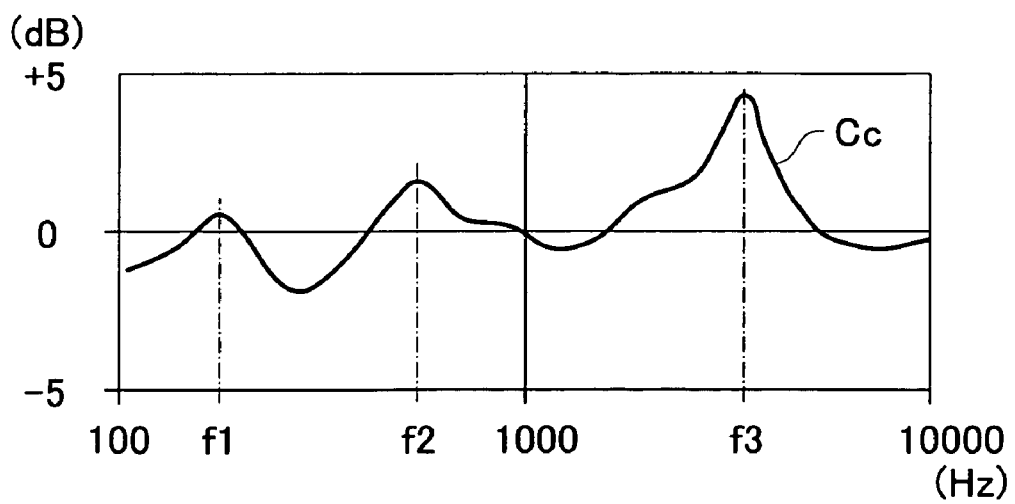
FIG. 5 is a view showing a frequency characteristic obtained by subtracting a solid line curve from a broken line curve in FIG. 4.

The frequency characteristic of FIG. 5 is obtained by subtracting the characteristic of the solid line curve Ca from the characteristic of the broken line curve Cb of FIG. 4. In FIG. 5, frequencies having positive peaks are frequencies f1, f2, and f3. The number of resonant frequencies in the loud sound space 40 is not limited to one, but may be in many cases more. This follows that one or more of the frequencies f1, f2, and f3 may be the resonant frequency. Based on the characteristic of FIG. 5, the frequencies which may be the resonant frequencies can be objectively detected.

Thus far, the method of detecting the resonant frequency in the resonant space 40 has been described with reference to FIGS. 2 to 5.

Figure 6:
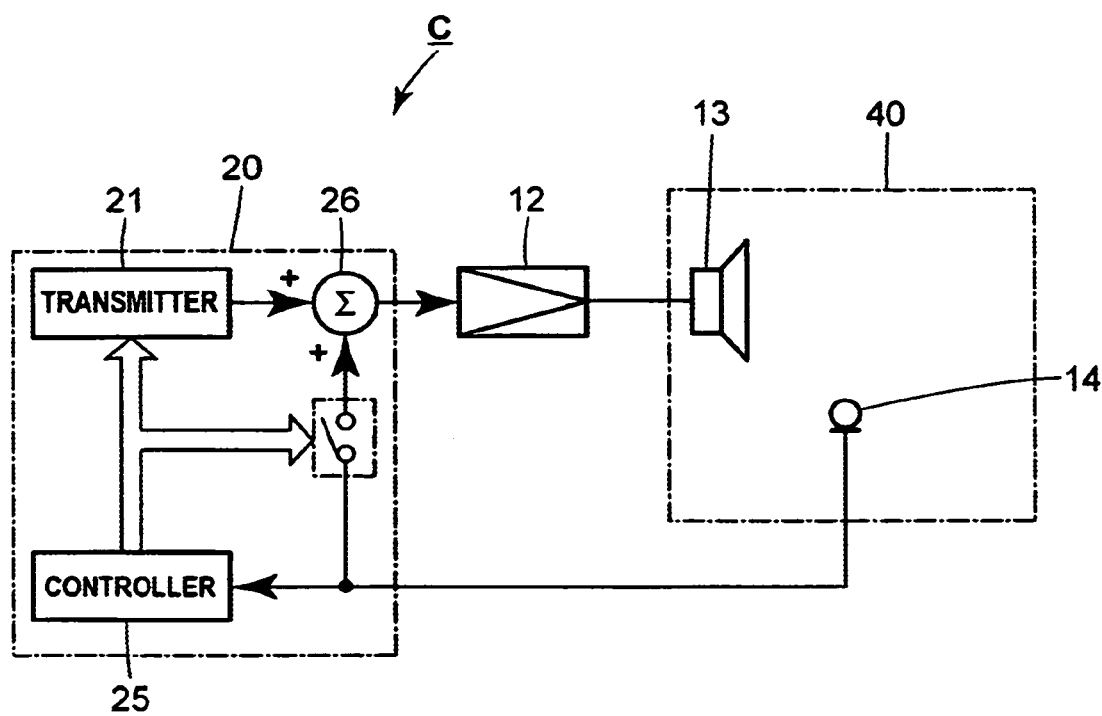
FIG. 6 is a schematic block diagram of a system including a detecting device according to an embodiment of a device for detecting a resonant frequency of the present invention.

FIG. 6 is a schematic block diagram of a system C including a detecting device 20 according to an embodiment of a device for detecting a resonant frequency of the present invention.

The system C comprises the detecting device 20, the amplifier 12 configured to receive, as an input, a signal output from the detecting device 20 and to power-amplify the signal, the speaker 13 configured to receive, as an input, the signal output from the amplifier 12 and to output a loud sound wave, and the microphone 14 configured to receive the loud sound wave radiated from the speaker 13. The detecting device 20 receives, as an input, the sound wave output from the microphone 14. The speaker 13 and the microphone 14 are placed within the loud sound space (e.g., concert hall or a gymnasium) 40. The microphone 14 is positioned to be sufficiently distant from the speaker 13 within the loud sound space 40. The microphone 14 is positioned so as to receive a reflected sound of the sound wave directly output from the speaker 13 at a sufficiently high level in the loud sound space 40.

The detecting device 20 includes a transmitter 21, a measurement and control portion 25, a mixer 26, and an opening and closing portion 27. The transmitter 21 functions as a sound source means configured to output the measurement signal. The measurement and control portion 25 functions as a control means configured to control the respective portions in the detecting device 20, and also functions as a measuring means configured to measure the frequency characteristic. The mixer 26 and the opening and closing portion 27 function as a signal synthesization switching means.

The system C is configured such that, in the detecting device 20, the measurement and control portion 25 controls the sound source portion 21 to cause the sound source portion 21 to output the measurement signal. The measurement signal is a sine wave signal whose frequency varies with time, i.e., a sine wave sweep signal. The sine wave sweep signal has a constant sine wave level at respective time points during frequency sweep.

The mixer 26 synthesizes (mixes) the signal output from the sound source portion 21 and the signal from the opening and closing portion 27, and outputs the synthesized signal (mixed signal). The amplifier 12 power-amplifies the signal output from the mixer 26 and outputs the amplified signal to the speaker 13, which radiates a loud sound wave in the loud sound space 40. The loud sound wave in the loud sound space 40 is received in the microphone 14, and the sound wave from the microphone 14 is input to the detecting device 20.

In the detecting device 20, the sound wave from the microphone 14 is divided into signals to be received in the measurement and control portion 25 and the opening and closing portion 27.

The measurement and control portion 25 has a band pass filter whose center frequency varies with time. The band pass filter varies its center frequency with time according to time variation in the frequency of the sine wave sweep signal output from the transmitter 21. Therefore, the measurement and control portion 25 detects the level of the signal which has been received as the input from the microphone 14 and has passed through the band pass filter, thus measuring an amplitude characteristic of the frequency at that point of time.

The measurement and control portion 25 is capable of controlling opening and closing the opening and closing portion 27. With the opening and closing portion 27 being in an "open" state, only the measurement signal from the transmitter 21 is input to the speaker 13 and the loud sound wave is output therefrom, while with the opening and closing portion 27 being in a "closed" state, the synthesized signal (mixed signal) containing the measurement signal from the transmitter 21 and the sound wave output from the microphone 14 is input to the speaker 13 and the loud sound wave is output therefrom.

With the opening and closing portion 27 being in the "open" state, the amplitude frequency characteristic is measured as in the meter 15 in the system A of FIG. 2, while with the opening and closing portion 27 being in the "closed" state, the amplitude frequency characteristic is measured as in the meter 15 in the system B of FIG. 3.

The measurement and control portion 25 measure the amplitude frequency characteristics in the states ("open" and "closed" states of the opening and closing portion 27), and subtracts the amplitude frequency characteristic in the "open" state from the amplitude frequency characteristic in the "closed" state of the opening and closing portion 27. Further, the measurement and control portion 25 detects frequencies having positive peaks in the resulting frequency characteristic. In this manner, the frequencies which may be the resonant frequencies in the loud sound space 40 can be objectively detected.

Thus far, the method and device for detecting the resonant frequency in the resonant space 40 have been described with reference to FIGS. 2 to 5 and 6.

Next, a method of selecting a frequency to be set as a dip center frequency in the dip filter 4 (see FIG. 1) from the resonant frequencies detected as described above.

First, the frequencies f1, f2, and f3 are obtained as the frequencies having the positive peaks from the frequency characteristic curve Cc of FIG. 5. It is highly probable that these frequencies are the resonant frequencies in the loud sound space 40. From them, predetermined frequencies are selected as candidates for the dip center frequency to be set in the dip filter 4 as frequencies to be removed.

Specifically, from these frequencies, candidate frequencies are selected in decreasing order of the amplitude levels in the curve Cb of FIG. 4.

Figure 7:
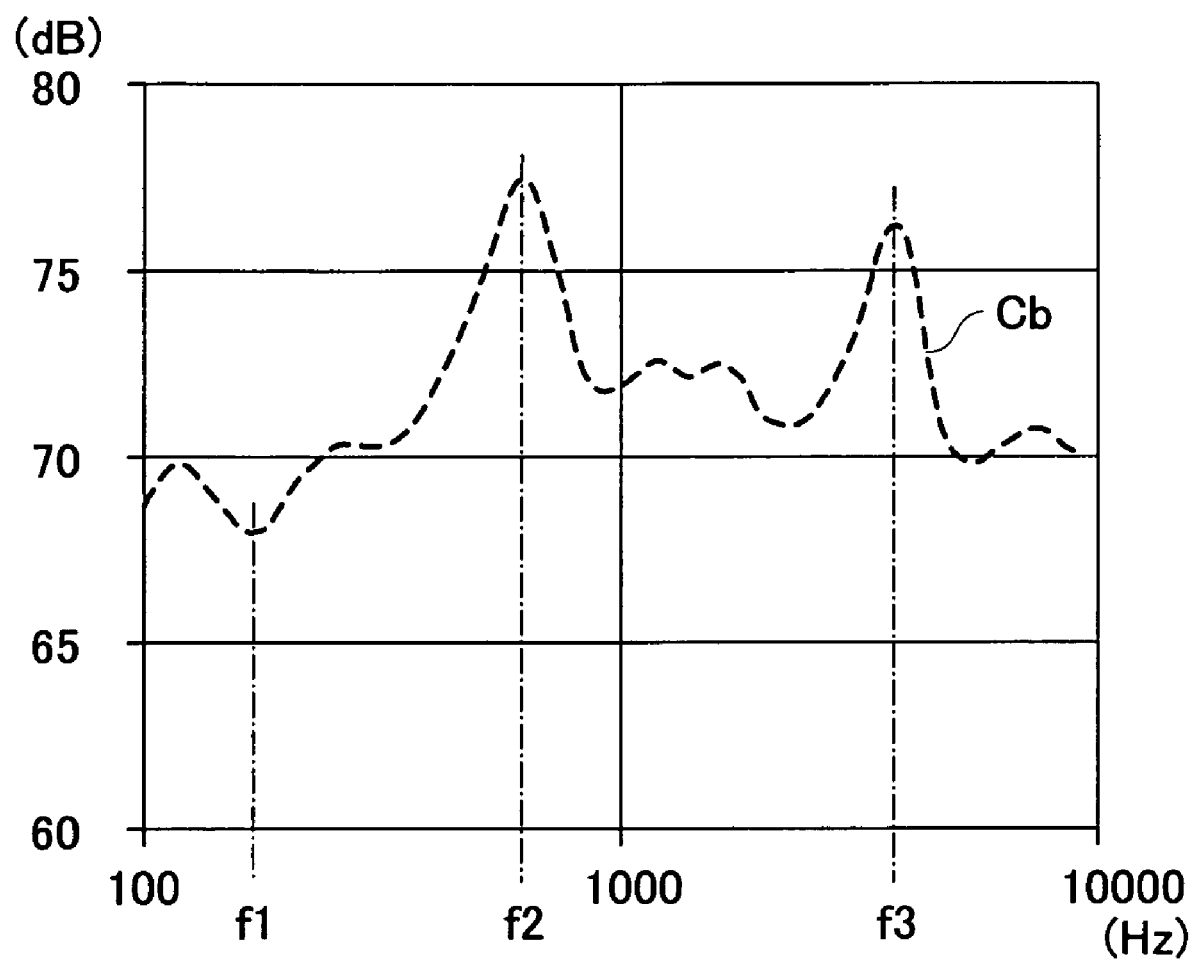
FIG. 7 is a view showing a characteristic obtained by extracting only a curve Cb from FIG. 4.

FIG. 7 is a view showing a characteristic obtained by extracting only the curve Cb from FIG. 4. In FIG. 7, an ordinate axis and an abscissa axis are logarithmic axes. The ordinate axis indicates an amplitude level and an abscissa axis indicates a frequency. In the curve Cb of FIG. 7, the amplitude levels of the frequencies f1, f2, and f3 decrease in the order of f2, f3, and f1. If the number of frequencies to be selected as the candidate frequency is "three," then all the frequencies f1, f2, and f3 are candidate frequencies. If the number of frequencies to be selected as the candidate frequency is "two," then the frequencies f2 and f3 are candidate frequencies.

The dip center frequencies may be set in the dip filter 4 according to a priority based on the magnitude of the amplitude levels in the curve Cb of FIG. 7. If the number of dips to be set in the dip filter 4 of FIG. 1 is "two", then the frequencies f2 and f3 are set as the dip center frequencies in the dip filter 4. If the number of dips to be set in the dip filter 4 is "one", only the frequency f2 is set as the dip center frequency in the dip filter 4.

Thus, the dip center frequencies to be set in the dip filter 4 may be finally determined according to the priority based on the magnitude of the amplitude levels in the curve Cb of FIG. 7. Alternatively, candidates for a plurality of dip center frequencies to be set in the dip filter 4 may be first selected according to the priority based on the magnitude of the amplitude levels in the curve Cb of FIG. 7 and then the order of the candidates (candidates for the dip center frequencies to be set in the dip filter 4) may be changed based on the magnitude of the amplitude levels in the curve Cc of FIG. 5.

Here it is assumed that all of the frequencies f1, f2, and f3 are candidate frequencies according to selection based on the magnitude of the amplitude levels in the curve Cb of FIG. 7. Then, the order of these candidate frequencies (frequencies f1, f2, and f3) is changed in decreasing order of the amplitude levels in the amplitude frequency characteristic curve Cc of FIG. 5. The amplitude levels of the frequencies f1, f2, and f3 in the curve Cc of FIG. 5 decrease in the order of the frequency f3, the frequency f2, and the frequency f1. Therefore, the frequency f3 is a first candidate frequency, the frequency f2 is a second candidate frequency, and the frequency f1 is a third candidate frequency.

If the number of dips to be set in the dip filter 4 of FIG. 1 is "two", then the frequencies f3 and f2 are set as the dip center frequencies in the dip filter 4. If the number of dips to be set in the dip filter 4 is "one", then only the frequency f3 is set as the dip center frequency in the dip filter 4.

In this manner, the dip center frequencies to be set in the dip filter 4 can be selected objectively without any experience and skill. By doing so, the resonance in the loud sound space 40 of FIG. 1 can be prevented effectively.

The reason why the candidates for the plurality of dip center frequencies to be set in the dip filter 4 are first selected according to the priority based on the magnitude of the amplitude levels in the curve Cb of FIG. 7 and then the order of the candidates (candidates for the dip center frequencies to be set in the dip filter 4) is changed based on the magnitude of the amplitude levels in the curve Cc of FIG. 5 is as follows. The curve Cb of FIG. 7 contains an amplitude frequency characteristic of the measurement system (system comprising the amplifier 12, the speaker 13, the microphone 14, etc) as well as the resonant characteristic of the loud sound space 40, and largely depends on the amplitude frequency characteristic of the measurement system as well as the resonant characteristic of the loud sound space 40. On the other hand, the curve Cc of FIG. 5 shows a noticeable effect of the resonant characteristic of the loud sound space 40, and a little effect of the amplitude frequency characteristic of the measurement system. For this reason, the resonance in the loud sound space 40 is more effectively prevented by finally determining the dip center frequencies to be set in the dip filter 4 based on the magnitude of the amplitude levels in the curve Cc of FIG. 5.

The above mentioned method of selecting the resonant frequency is effective when the dips to be set in the dip filter 4 or the detected resonant frequencies is larger in number. For example, when 200 or more resonant frequencies are detected, 120 frequencies may be selected as candidate frequencies in decreasing order of the amplitude levels in the curve Cb of FIG. 7, and the remainder may be excluded. Further, the order of these 120 frequencies selected as the candidate frequencies may be changed based on the magnitude levels in the curve Cc of FIG. 5, and higher 8 frequencies in this changed order may be set as the dip center frequencies in the dip filter 4.

Thus far, the embodiments of the present invention have been described with reference to FIGS. 1 though 7.

While in the above described embodiments, the method and device for detecting the resonant frequency of the present invention is applied to detection of the resonant frequency in the loud sound space in which the acoustic equipment is installed, they may alternatively be applied to all spaces (resonant space) which require detection of resonant frequencies, as well as the loud sound space. For example, the method and device for detecting the resonant frequency of the present invention is applicable to a technique for measuring a volume of a space in a liquid tank in which a liquid is not filled, by detecting the resonant frequency, in order to measure the amount of the liquid filled in the liquid tank.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

In accordance with present invention, the resonant frequency can be accurately detected without a need for any experience or skill. A frequency to be set as a dip center frequency in a dip filter is objectively selected from detected resonant frequencies. Therefore, the present invention is useful in technical fields of acoustic equipment, etc.

The invention claimed is:

1. A method of detecting a resonant frequency, comprising:
   a first step of measuring a first amplitude frequency characteristic;
   a second step of measuring a second amplitude frequency characteristic,
   wherein the first amplitude frequency characteristic is an amplitude frequency characteristic obtained by outputting a loud sound wave of a predetermined measurement signal from a speaker placed in a resonant space and by receiving the loud sound wave in a microphone placed in the resonant space, and
   wherein the second amplitude frequency characteristic is an amplitude frequency characteristic obtained by outputting, from the speaker, a loud sound wave of a synthesized signal containing the measurement signal and a signal output from the microphone and by receiving the loud sound wave of the synthesized signal in the microphone, and
   detecting a resonant frequency in the resonant space based on a comparison between the first amplitude frequency characteristic measured in the first step and the second amplitude frequency characteristic measured in the second step.

2. The method of detecting a resonant frequency according to claim 1, wherein a peak frequency at which an amplitude of the second amplitude frequency characteristic is larger than an amplitude of the first amplitude frequency characteristic is detected as the resonant frequency, from a difference between the first amplitude frequency characteristic and the second amplitude frequency characteristic.

3. The method of detecting a resonant frequency according to claim 1, wherein the measurement signal is a sine wave sweep signal.

4. A method of selecting a resonant frequency comprising:
   detecting a plurality of resonant frequencies by the method of detecting a resonant frequency according to claim 1; and
   selecting dip center frequencies to be set in a dip filter in decreasing order of amplitude levels in the second amplitude frequency characteristic, from the plurality of detected resonant frequencies.

5. A method of selecting a resonant frequency comprising:
   selecting a plurality of resonant frequencies by the method of selecting a resonant frequency according to claim 4; and
   preferentially selecting, from the plurality of selected resonant frequencies, dip center frequencies to be set in a dip filter in decreasing order of amplitude levels in an amplitude frequency characteristic obtained by subtracting the first amplitude frequency characteristic from the second amplitude frequency characteristic.

6. A device for detecting a resonant frequency comprising:
   a sound source means for generating a measurement signal output from a speaker,
   a signal synthesization switching means for receiving, as inputs, the measurement signal from the sound source means and a signal output from a microphone,
   wherein the signal synthesization switching means is capable of switching between a first state in which the signal synthesization switching means outputs the measurement signal and a second state in which the signal synthesization switching means outputs a synthesized signal containing the measurement signal and the signal output from the microphone, and
   a measuring means for measuring an amplitude frequency characteristic from the signal output from the microphone,
   wherein the measuring means is configured to detect a resonant frequency based on a comparison between a first amplitude frequency characteristic measured in the first state of the signal synthesization switching means and a second amplitude frequency characteristic measured in the second state of the signal synthesization switching means.

7. The device for detecting a resonant frequency according to claim 6, wherein a peak frequency at which an amplitude of the second amplitude frequency characteristic is larger than an amplitude of the first amplitude frequency characteristic is detected as the resonant frequency from a difference between the first amplitude frequency characteristic and the second amplitude frequency characteristic.

8. The device for detecting a resonant frequency according to claim 6, wherein the measurement signal is a sine wave sweep signal.

9. The method of detecting a resonant frequency according to claim 2, wherein the measurement signal is a sine Wave sweep signal.

10. The device for detecting a resonant frequency according to claim 7, wherein the measurement signal is a sine wave sweep signal.

* * * * *

UNITED STATES PATENT AND TRADEMARK OFFICE
CERTIFICATE OF CORRECTION

PATENT NO. : 7,249,511 B2  Page 1 of 1
APPLICATION NO. : 10/537984
DATED : July 31, 2007
INVENTOR(S) : Daisuke Higashihara It is certified that error appears in the above-identified patent and that said Letters Patent is hereby corrected as shown below:

On the Title Page:

At field (54), "METHOD OF DETECTING RESONANT FREQUENCY, METHOD OF SELECTING RESONANT FREQUENCY, AND DEVICE FOR DETECTING RESONANT FREQUENCY SENSOR" should be -- METHOD OF DETECTING RESONANT FREQUENCY, METHOD OF SELECTING RESONANT FREQUENCY, AND DEVICE FOR DETECTING RESONANT FREQUENCY --.

At field (75), "Hyogo" should be -- Takarazuka-shi --.

In the Specification:

At Column 1, line 1, "METHOD OF DETECTING RESONANT FREQUENCY, METHOD OF SELECTING RESONANT FREQUENCY, AND DEVICE FOR DETECTING RESONANT FREQUENCY SENSOR" should be -- METHOD OF DETECTING RESONANT FREQUENCY, METHOD OF SELECTING RESONANT FREQUENCY, AND DEVICE FOR DETECTING RESONANT FREQUENCY --.

In the Claims:

At Column 12, line 6, "Wave" should be -- wave --.

Signed and Sealed this

Thirteenth Day of November, 2007

JON W. DUDAS
*Director of the United States Patent and Trademark Office*